United States Patent
Smith et al.

(10) Patent No.: US 12,480,790 B2
(45) Date of Patent: *Nov. 25, 2025

(54) METHOD FOR INSTALLING A SENSOR CONDUIT SUPPORT IN AN INTERNAL STRUCTURE

(71) Applicant: SILVERSMITH, INC., Gaylord, MI (US)

(72) Inventors: Justin Pearson Smith, Gaylord, MI (US); John P. Smith, Gaylord, MI (US); Kevin Janka, Gaylord, MI (US); Michael Rose, Beaumont (CA); Mark Hopkins, Gaylord, MI (US)

(73) Assignee: SILVERSMITH, INC., Gaylord, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,864

(22) Filed: Jun. 10, 2024

(65) Prior Publication Data
US 2024/0328837 A1 Oct. 3, 2024

Related U.S. Application Data

(62) Division of application No. 17/883,740, filed on Aug. 9, 2022, now Pat. No. 12,038,306.

(60) Provisional application No. 63/232,332, filed on Aug. 12, 2021.

(51) Int. Cl.
*G01D 11/24* (2006.01)
*E03B 9/02* (2006.01)

(52) U.S. Cl.
CPC .............. *G01D 11/245* (2013.01); *E03B 9/02* (2013.01)

(58) Field of Classification Search
CPC ................................ G01D 11/245; E03B 9/02
See application file for complete search history.

(56) References Cited

U.S. PATENT DOCUMENTS

| | | | |
|---|---|---|---|
| 5,377,906 | A | 1/1995 | Mason |
| 6,031,455 | A | 2/2000 | Grube et al. |
| 6,390,027 | B1 | 5/2002 | Lyons et al. |
| 6,816,072 | B2 | 11/2004 | Zoratti |
| 6,842,430 | B1 | 1/2005 | Melnik |
| 7,021,327 | B2 | 4/2006 | Creel |
| 7,983,869 | B1 | 7/2011 | Hurley |
| 8,657,021 | B1 | 2/2014 | Preta et al. |
| 8,823,509 | B2 | 9/2014 | Hyland et al. |

(Continued)

FOREIGN PATENT DOCUMENTS

| | | | |
|---|---|---|---|
| CA | 2154433 A1 | | 1/1997 |
| CN | 209130275 U | * | 7/2019 |

(Continued)

*Primary Examiner* — Jamel E Williams
(74) *Attorney, Agent, or Firm* — Price Heneveld LLP

(57) ABSTRACT

A method for installing a sensor assembly in a fire hydrant includes sequentially feeding components of the sensor assembly through an aperture in an upper standpipe of the fire hydrant. The components of the sensor assembly include a sensor unit, a conduit coupled with the sensor unit and extending away therefrom, and a series of rigid tubes surrounding the conduit and arranged in an end-to-end manner. The conduit is fed through the aperture along with the series of rigid tubes, and at least one of the series of rigid tubes has a length greater than a diameter of an interior of the fire hydrant.

14 Claims, 9 Drawing Sheets

(56) References Cited

U.S. PATENT DOCUMENTS

| | | |
|---|---|---|
| 8,843,241 B2 | 9/2014 | Saberi et al. |
| 8,997,777 B2 | 4/2015 | Montague |
| 9,315,973 B2 | 4/2016 | Varman et al. |
| 9,388,554 B2 | 7/2016 | Bost |
| 9,593,999 B2 | 3/2017 | Fleury, Jr. et al. |
| 9,670,650 B2 | 6/2017 | Pinney et al. |
| 9,901,765 B2 | 2/2018 | Silvers et al. |
| 10,612,216 B2 * | 4/2020 | Kennedy .................. E03B 7/02 |
| 2005/0174245 A1 | 8/2005 | Delaney et al. |
| 2010/0295672 A1 | 11/2010 | Hyland et al. |
| 2011/0066297 A1 | 3/2011 | Saberi et al. |
| 2012/0004866 A1 * | 1/2012 | Plouffe .................... E03B 9/02 |
| | | 702/50 |
| 2013/0036796 A1 | 2/2013 | Fleury, Jr. et al. |
| 2014/0340238 A1 * | 11/2014 | Hyland .................... H04Q 9/00 |
| | | 340/870.01 |
| 2016/0093193 A1 * | 3/2016 | Silvers .................. A62C 35/20 |
| | | 340/870.07 |
| 2016/0101307 A1 * | 4/2016 | Montague ................. E03B 9/14 |
| | | 137/287 |
| 2017/0121949 A1 * | 5/2017 | Fleury, Jr. ............... G01M 3/00 |
| 2020/0080290 A1 * | 3/2020 | Kennedy .................. E03B 9/02 |
| 2021/0198873 A1 * | 7/2021 | Sitnikov ............... G01L 19/086 |
| 2023/0052748 A1 | 2/2023 | Smith et al. |

FOREIGN PATENT DOCUMENTS

| | | | |
|---|---|---|---|
| CN | 110975211 A | * | 4/2020 |
| CN | 210397908 U | * | 4/2020 |
| WO | 2014189901 A1 | | 11/2014 |

* cited by examiner

METHOD FOR INSTALLING A SENSOR CONDUIT SUPPORT IN AN INTERNAL STRUCTURE

CROSS REFERENCE TO RELATED APPLICATION

This application is a division of U.S. patent application Ser. No. 17/883,740, filed Aug. 9, 2022, entitled "SENSOR CONDUIT SUPPORT STRUCTURE," which claims the benefit under 35 U.S.C. § 119 (e) to U.S. Provisional Patent Application No. 63/232,332, filed Aug. 12, 2021, entitled "SENSOR CONDUIT SUPPORT STRUCTURE," which is incorporated herein by reference in its entirety.

TECHNOLOGICAL FIELD

The present disclosure relates generally to a sensor assembly for monitoring a condition within an internal structure and, more particularly to a support structure for retaining a sensor unit in a desired position within the internal structure.

BACKGROUND

Monitoring systems for communicating information regarding fire hydrants to a municipal or industrial monitoring server are generally known. In one application, similar monitoring units can be mounted to each of the multiple fire hydrants that are remote from the monitoring server and can be configured to detect an event of interest in the respective fire hydrant and to generate an adverse event signal in response to the event that is transmitted to the monitoring server. An example of such a system, including the configuration of a network of units and the transmission of signals to the server is discussed in U.S. Pat. No. 9,901,765, assigned to Silversmith Inc., the entire contents of which are hereby incorporated by reference herein. In at least one aspect of such a system, a sensor unit, configured as a water-presence sensor is included to detect the presence of water above a valve of a fire hydrant, such as what may be generally described as a "dry barrel" hydrant, that intended to maintain water beneath the valve and outside of the lower standpipe when the valve is closed and the fire hydrant is not in use. In this manner, the presence of water above the valve and within the lower standpipe may indicate improper operation of the fire hydrant. In a similar manner, the non-detection of water above valve may be used to indicate proper operation of the fire hydrant, as confirmed by periodic checks conducted by the monitoring system. In a further example, the presence of water above the valve may indicate intended use or operation of fire hydrant, including but not limited to scheduled "flushing" of the hydrant, which may be monitored or confirmed by monitoring system. The monitoring system may be configured to use the sensor assembly to report other operational parameters or conditions, including but not limited to adverse conditions, depending on the sensor unit configuration, the use or application of the internal structure, and user needs.

Because it may be generally desired to be aware of various detected conditions, such as those discussed above, without significant delay, including before the water level above the valve reaches a point where it may freeze and cause damage to the hydrant, it may be desired to place the sensor unit at a certain depth below the ground surface, for example. In some implementations, the lower standpipe of a hydrant may extends below the ground surface by a distance of at least about 6-10 ft., such positioning requiring a related sensor assembly to have a conduit of a length that corresponds with the increased length of the lower standpipe such that the sensor unit can be appropriately positioned and can communicate with the electronic components associated with the monitoring of the sensor unit status and communicating the above-described events to the server, such components being positioned above the ground surface, including by being mounted on the outside of the upper standpipe.

In certain implementations, the conduit used in connection with the sensor assembly may exhibit varying degrees of flexibility or rigidity, depending, for example, on the particular material used for conduit and/or the particular structure of the conduit. In various implementations conduits may be of cross-linked polyethylene ("PEX") and/or may include some level of internal support to increase the stiffness of the conduit and to increase, for example, a bending radius thereof. Accordingly, when a sensor system is used in connection with a fire hydrant having a more conventional lower standpipe length, similar sensor unit used therewith for purposes similar to those discussed above may be generally maintained in the desired location adjacent the valve by gravity and the stiffness of the conduit. In this manner, when the valve is opened to allow use of the fire hydrant, the flow of water past the valve and through the lower standpipe can exert an upward force on the sensor unit. As the entire interior of the fire hydrant is filled with water when the fire hydrant is in use, the exact position of the sensor unit adjacent the valve does not necessarily have to be maintained against such use, as long as the sensor unit remains within the interior of the fire hydrant. Further, continued use of the sensor system is possible as long as the sensor unit can move back into the desired location when the valve is re-closed. Again, when used in connection with a fire hydrant having a lower standpipe length of, for example, about 3 ft., the stiffness of a conduit similar to that which is discussed above is generally sufficient to ensure that such a condition is achieved. However, when used in connection with the fire hydrant requiring a greater length of the lower standpipe, the overall flexibility of the conduit increases due to its correspondingly increased length, in spite of any internal reinforcement, such that the chance of the sensor unit being moving to a position within the fire hydrant away from that which is desired for proper monitoring and, for example, becoming stock or lodged, in such a position under flexing of the conduit during use is increased. Accordingly, further advances for monitoring such fire hydrants, or other structures with similar distance and pressure concerns, may be desired.

SUMMARY

According to one aspect of the present invention, a sensor assembly includes a sensor unit including at least one electronic sensor component, a conduit coupled with the sensor unit and extending away from the sensor unit, and a rigid support structure supporting a portion of at least one of the conduit or the sensor unit at a first end adjacent the sensor unit and extending away from the sensor unit to a length of at least about 6 feet. The rigid support structure is configured to maintain the sensor unit within an internal structure for monitoring using the electronic sensor component.

In one implementation, the internal structure may be an interior of a fire hydrant including a bonnet, an upper standpipe coupled with the bonnet, and a lower standpipe coupled with the upper standpipe. The rigid support structure can thusly be configured to maintain the sensor unit within the internal structure against a flow of fluid through the lower standpipe and upper standpipe and out of an outlet in the bonnet. In one aspect, the rigid support structure can be defined by an operating valve stem extending from the valve to a valve opening nut mounted on an exterior of the bonnet with the sensor unit being coupled to a portion of the rod adjacent the valve. In such an aspect, the sensor unit can be coupled to the portion of the rod by way of a clamp assembly including a first clamp coupled with the rod and a second clamp joined with the first clamp and coupled with the sensor unit. Alternatively, the rigid support structure can be a solid, elongate body having a first end with which the sensor unit is coupled and a second end configured to extend from the sensor unit, through the lower standpipe and the upper standpipe, and into the bonnet. In a still further variation, the rigid support structure can be defined by a series of rigid tubes surrounding respective portions of the conduit. The series of rigid tubes may be sequentially arranged in an end-to-end manner.

According to another aspect of the present invention, a method for installing a sensor assembly in a fire hydrant includes sequentially feeding components of the sensor assembly through an aperture in an upper standpipe of the fire hydrant. The components of the sensor assembly include a sensor unit, a conduit coupled with the sensor unit and extending away therefrom, and a series of rigid tubes surrounding the conduit and arranged in an end-to-end manner. The conduit is fed through the aperture along with the series of rigid tubes, and at least one of the series of rigid tubes has a length greater than a diameter of an interior of the fire hydrant.

According to another aspect of the present invention, a sensor assembly for water monitoring within a hydrant having a bonnet portion, an upper standpipe portion extending from the bonnet portion, and a lower standpipe portion extending from the upper standpipe portion. The assembly includes a sensor unit including at least one electronic sensor component, a conduit coupled with the sensor unit and extending away from the sensor unit to a length of at least about 6 feet, and a series of rigid tubes surrounding respective portions of the conduit so as to support a portion of at least one of the conduit or the sensor unit at a first end adjacent the sensor unit and extending away therefrom. The series of rigid tubes is configured to maintain the sensor unit within the interior of the fire hydrant against a flow of fluid through the lower standpipe portion and upper standpipe portion and out of an outlet in one of the bonnet portion or the upper standpipe portion.

According to another aspect of the present invention, a method for installing a sensor assembly in an internal structure includes accessing the internal structure from an exterior of the structure and inserting a sensor assembly, including a sensor unit having at least one electronic sensor component and a conduit coupled with the sensor and extending away from the sensor unit, into the internal structure. The method also includes connecting the conduit with a fitting received in an aperture from the exterior to the internal structure and supporting a portion of at least one of the conduit or the sensor unit with a rigid support structure at a first end adjacent the sensor unit and extending away from the sensor unit to a length of at least about 6 feet, the rigid support structure configured to maintain the sensor unit within the internal structure for monitoring using the electronic sensor component.

BRIEF DESCRIPTION OF THE DRAWINGS

The present invention will become more fully understood from the detailed description and the accompanying drawings, wherein.

DETAILED DESCRIPTION OF EMBODIMENTS

Figure 1:
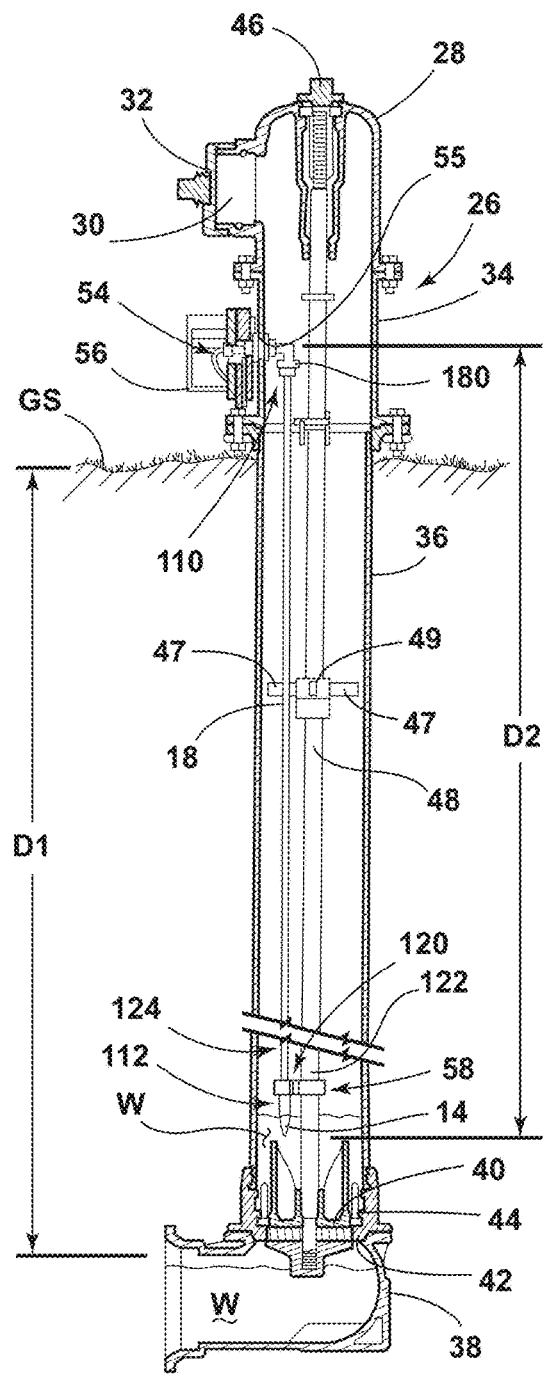
FIG. 1 is a side view of a sensor assembly according to an aspect of the present disclosure installed in a fire hydrant, shown in a side cross-section view.

The present illustrated embodiments reside primarily in combinations of method steps and apparatus components related to a sensor support structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the embodiment shown in FIG. 1, a sensor unit 10 including least one electronic sensor component 16 (FIG. 10), a conduit 18 coupled with and extending away from the sensor unit 10, and a rigid support structure 20 supporting a portion of at least one of the conduit 18 or the sensor unit 12 at a first end 22 adjacent the sensor unit 12. The rigid support structure 20 extends away from the sensor unit 12 to a length of at least about 6 feet. The rigid support structure 20 is configured to maintain the sensor unit 12 within an internal structure 24 for monitoring using the electronic sensor component. Additional embodiments of the sensor assembly 10 according to further aspects of the disclosure are shown in FIGS. 3-10 and discussed below with reference to those figures. Various embodiments of the present sensor assembly 10 are described herein with reference to the drawings where similar features are indicated with similar numbering increased by multiples of 100. The embodiments of the sensor assembly 10 are generally useable to maintain the positioning of the sensor unit 12 (which as described further below may be in the form of a water presence sensor, a water pressure sensor, or the like) within an internal structure with spatial or environmental factors such that the conduit alone may not be able to maintain, with desired reliability, such positioning during use of the sensor unit and/or during, or after, certain events or conditions that may arise within the internal structure during use thereof. In certain applications, one or more of the support structures described herein can be used to maintain the desired position of a sensor unit within, for example: a reservoir, tank, or the like for storing water or another fluid; a network of pipes or other conduits for the transportation of water or another fluid; or other such structure. In any such example, the present sensor assembly 10, including the rigid support structures 20 discussed below, may be useful of installation in pre-existing internal structures, in particular, where the sensor unit 12 is to-be maintained in a position that is remote from an available access point. In such applications, the rigid support structure 20 can be used or adapted to extend from an access point to a desired sensor unit location that would be otherwise inaccessible and that would be too far from the access point to be supported by the conduit alone.

Additionally, the present sensor assemblies may be further useful for maintaining the sensor unit in a desired position within the desired internal structure under challenging conditions. Referring to the example shown in FIG. 1, the selected internal structure is an interior 24 of a fire hydrant 26. The depicted fire hydrant 26 is generally representative of fire hydrants in general, but is, nevertheless, depicted with some specificity with respect to a particular implementation of a fire hydrant such that adaptations of the present disclosure can be made to operate with different fire hydrants, including those provided by different manufacturers of fire hydrants, or different models of fire hydrants, with a generally similar structure and are to be generally understood. As illustrated, the fire hydrant 26 according to the present example includes a bonnet portion 28 that encloses the upper portion of the fire hydrant 26 and is generally dome or bell-shaped. The fire hydrant 26 also includes an upper standpipe portion 34 to which the bonnet 28 is mounted and that extends upward from generally close to the ground surface GS where it is coupled with a lower standpipe portion 36. The fire hydrant 26, according to the present illustration defines at least one threaded outlet 30 covered by a cap 32, which is depicted as being defined within the bonnet portion 28. As is understood, however, different types, models, styles, etc. of fire hydrants 26 may be configured differently such that, for example, the outlets 30 may be positioned within the upper standpipe portion 34. In at least this respect, it is to be appreciated that different fire hydrants 26 may be configured with the above-referenced bonnet portion 28, upper standpipe portion 34, and lower standpipe portion 36 in somewhat different locations or arrangements than what is depicted in FIG. 1. Notably, in the example of FIG. 1, the bonnet portion 28, the upper standpipe 34, and the lower standpipe 36 are shown as separate components that are physically coupled together and, accordingly, separable elements. In various alternative arrangements, however, the portions of the fire hydrant 26 may be rigidly coupled or integrally formed together, with physical separations located within structures that could otherwise be regarded as the bonnet portion 28, the upper standpipe portion 34, and the lower standpipe portion. As discussed above, some fire hydrants may have a generally different shape, such that the various portions may be relatively larger or smaller than depicted, including the above-mentioned reduction in size of the bonnet portion 28 such that the outlet(s) 30 are present within the upper standpipe portion 34.

The fire hydrant 26, as depicted, further includes a shoe 38 coupled with the lower standpipe 36 that connects with the municipal water source and directs the flow of water W (when active) upward into the lower standpipe 36 such that the water W can flow through the lower standpipe 36, the upper standpipe 34 and out of the outlet 30 in the bonnet 28 to, for example supply water W to a fire hose connected with the outlet 30 (after removal of cap 32). To prevent the flow of water W out of the shoe 38, when such flow is not desired, the fire hydrant 26 includes a valve 40 mounted within a valve seat flange 42 that is defined between the lower standpipe 36 and the shoe 38. The valve 40 fits within a valve liner 44 that is positioned above the flange 42. The position of the valve 40 is controlled by an operator using the operating nut 46 that is connected with an operating valve stem 48 to move the valve 40 toward and away from the valve seat flange 42 when the operating nut 46 is turned such that rotation of the operating nut 46 in one direction moves the operating valve stem 48 to lift the valve 40 into a closed position engaged with the flange 42 and opposite rotation of the operating nut 46 moves the operating valve stem 48 to lower the valve 40 into a range of open positions where the valve 40 is separated from the flange 42, thusly allowing water to flow pass the valve 40 and into the lower standpipe 36. In other examples, the shoe 38 can be configured to couple with a vertically-directed branch of the municipal water supply.

As further illustrated in FIG. 1, the distance D1 that the lower standpipe 36 extends to meet the shoe 38 can vary depending on the depth of the water source, with which the shoe 38 connects, beneath the ground surface GS. As can be appreciated, this depth D1 can vary due to a number of factors, including the topography or surrounding structure of the fire hydrant location or the operating environment of the fire hydrant 26. In one example, locations where the ground G adjacent to the ground surface GS is subject to long periods of freezing at a significant depth (e.g., a "frost line" at a depth of about 6 feet or greater) or with a relatively high ground water depth (i.e. of less than about 8 feet or less than about 6 feet), the municipal (or industrial, depending on the setting) water source may be positioned at a depth below such freezing depth or below a depth where higher ground water may be subjected to freezing, thereby requiring a greater distance D1 for the lower standpipe 36 to reach the shoe 38. In some applications, including in some fire hydrant applications in Canada, for example, the distance D1 through which the lower standpipe 36 extends may be at least about 7 feet and in some instances up to about 20 feet, although for many applications, a distance D2 of approximately 10 feet may be sufficient for monitoring purposes. Additionally, in some applications, the portion of lower standpipe 36 above the valve 40 may be filled, after use of the fire hydrant 26, with glycol or another liquid with a freezing point lower than water, which may reduce D1 to a position farther above valve 40 than depicted.

The example fire hydrant 26 of FIG. 1 includes a monitoring system 50 configured to communicate information regarding the fire hydrant 26 to a municipal or industrial monitoring server 52. Similar monitoring systems 50 can be mounted to each of the multiple fire hydrants 26 that are remote from the monitoring server 52 and can be configured to detect an event of interest in the respective fire hydrant 26 and to generate an adverse event signal in response to the event that is transmitted to the monitoring server 52. Such a system 50, including the configuration of a network of such systems 50 and the transmission of signals to the server 52 is discussed further in U.S. Pat. No. 9,901,765, assigned to Silversmith Inc., the entire contents of which are hereby incorporated by reference herein. In at least one aspect of such a system, a sensor unit 12, configured as a water-presence sensor is included to detect the presence of water above the valve 40. As can be appreciated, the illustrated fire hydrant 26 is what may be generally described as a "dry barrel" hydrant, that, by way of the placement of the valve 40, is intended to maintain water beneath the valve 40 and outside of the lower standpipe 36 when the valve 40 is closed and the fire hydrant 26 is not in use. In this manner, the presence of water W above the valve 40 and within the lower standpipe 36 may indicate improper operation of the fire hydrant 26 (such as the valve 40 not being fully closed) or damage or malfunction of the valve 40. In a similar manner, the non-detection of water above valve 40 may be used to indicate proper operation of the fire hydrant 26, as confirmed by periodic checks conducted by the monitoring system 50. In a further example, the presence of water above valve 40 may indicate intended use or operation of fire hydrant, including but not limited to scheduled "flushing" of the hydrant, which may be monitored or confirmed by monitoring system 50. The monitoring system 50 may be configured to use the sensor assembly 10 to report other operational parameters or conditions, including but not limited to adverse conditions, depending on the sensor unit 12 configuration, the use or application of the internal structure 24, and user needs.

Because it may be generally desired to be aware of various detected conditions, such as those discussed above, without significant delay, including before the water level above the valve 40 reaches a point where it may freeze and cause damage to the hydrant 26, the sensor unit 10 is placed at a certain depth below the ground surface GS, for example. In the depicted implementation of the hydrant 26 having the lower standpipe 36 that extends by a distance D1 of at least about 6-10 ft., such positioning requires sensor assembly 10 to have a conduit 18 of a length D2 that corresponds with the increased length of the lower standpipe 36 such that the sensor unit 12 can be appropriately positioned and can communicate with the electronic components 54 associated with the monitoring of the sensor unit status and communicating the above-described events to the server 52, which are positioned, for example in a box 56 mounted on the outside of the upper standpipe 34, the conduit 18 being connected with the electronic components 54 through an aperture 55 in the upper standpipe 34 over which the box 56 is assembled.

In certain implementations, the conduit 18 used in connection with the sensor assembly 10 may exhibit varying degrees of flexibility or rigidity, depending, for example, on the particular material used for conduit 18 and/or the particular structure of conduit 18. In one example, the conduit 18 may be of cross-linked polyethylene ("PEX") and/or may include some level of internal support to increase the stiffness of the conduit 18 and to increase, for example a bending radius thereof. Accordingly, when a sensor system is used in connection with a fire hydrant having a more conventional lower standpipe length, a similar sensor unit used therewith for purposes similar to those discussed above may be generally maintained in the desired location adjacent the valve by gravity and the stiffness of the conduit. In this manner, when the valve is opened to allow use of the fire hydrant, the flow of water past the valve and through the lower standpipe can exert an upward force on the sensor unit. As the entire interior of the fire hydrant is filled with water when the fire hydrant is in use, the exact position of the sensor unit adjacent the valve does not necessarily have to be maintained against such use, as long as the sensor unit remains within the interior of the fire hydrant. Further, continued use of the sensor system is possible as long as the sensor unit can move back into the desired location when the valve is re-closed. Again, when used in connection with a fire hydrant having a lower standpipe length D1 of, for example, about 3 ft., the stiffness of a conduit similar to that which is discussed above is generally sufficient to ensure that such a condition is achieved. However, when used in connection with the fire hydrant 26 requiring a greater length D1 of the lower standpipe 36, such as depicted in FIG. 1, the overall flexibility of the conduit 18 increases due to its correspondingly increased length D2, in spite of any internal reinforcement, such that the chance of the sensor unit 12 being moving to a position within the fire hydrant 26 away from that which is desired for proper monitoring and, for example, becoming stock or lodged, in such a position under flexing of the conduit 18 during use is increased.

Figure 2A:
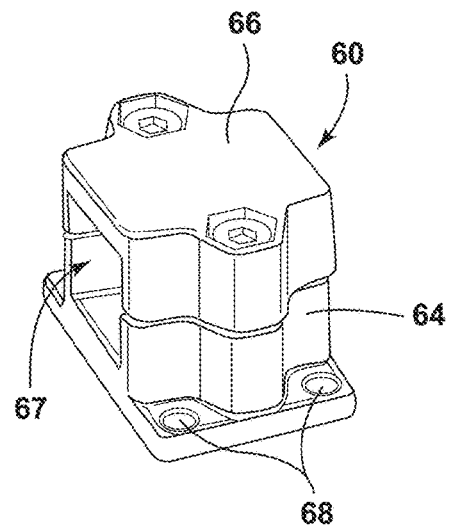
FIG. 2A is a first clamp portion used in the assembly of FIG. 1.
Figure 2B:
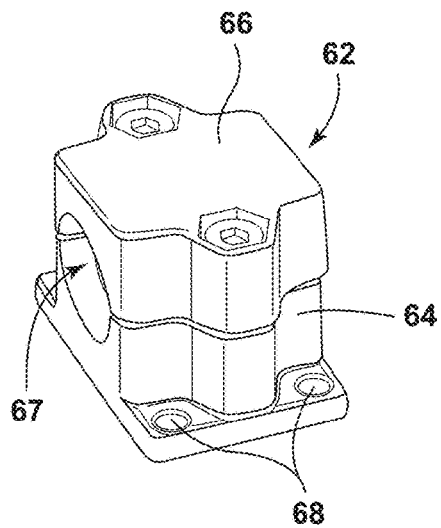
FIG. 2B is a second clamp portion used in the assembly of FIG. 1.

To prevent the unwanted movement or dislodgement of the sensor unit 12 within or out of the example fire hydrant 26, an example of a sensor assembly 10 according to one aspect of the present disclosure, as shown in FIG. 1, can be used. As discussed above, the present sensor assembly 10 utilizes the rigid support structure 20 to maintain the desired position of the sensor unit 12 adjacent the valve 40 of the fire hydrant 26, with the present rigid support structure 20 including the operating valve stem 48 described above and associated with the operation of the valve 40. To utilize the operating valve stem 48 within the rigid support structure 20, a clamp assembly 54 is also included in the support structure 20 to couple the sensor unit 12 to the operating valve stem 48. As shown in FIGS. 2A and 2B, the clamp assembly 58 can include a first clamp 60 (FIG. 2A) configured to be affixed to the operating valve stem 48 and a second clamp 62 (FIG. 2B) configured to be affixed to the sensor unit 12, with the respective clamps 60 and 62 being further configured to be affixed to each other. Such an arrangement allows for different individual clamps 60 and 62 to be selected based on the sizes of the sensor unit 12 and the operating valve stem 48, individually, as such sizes may vary independent of each other.

As shown in detail in FIGS. 2A and 2B, each of the clamps 60 and 62 is similarly configured with a base 64 and a cover 66 adjustably affixable to the base 64 using screws 65. The bases 64 and covers 66 mutually define an aperture 67 therethrough to receive the respective one of the sensor unit 12 and the operating valve stem 48, the size of the aperture 67 being adjustable to receive and clamp onto the respective article, as is generally understood with respect to the operation of such clamps. In the illustrated examples, the clamp 60 for assembly with the operating valve stem 48 has an aperture 67 with a generally rectangular profile and the clamp 62 for assembly with the sensor unit 12 defines a round profile. Such profiles can be selected to correspond with the geometry of the associated article for retention within the specific clamp 60 or 62 and can be interchanged or otherwise adapted for use with differently-shaped sensor housings 14 and operating valve stems 48 and/or to achieve the desired retention characteristics and adaptability. Each base 64 includes at least one hole 68 (four being shown in the example clamps 160 and 162 shown in the figures, although other arrangements are possible) for affixing the clamps 160 and 162 to each other using, for example respective nuts and bolts (or other mechanical fasteners, including rivets, adhesives or the like).

In practice, appropriately-sized clamps can be individually selected to fit on the respective sensor unit 12 and operating valve stem 48 and assembled together at the bases 64 thereof to complete the desired clamp assembly 58. In many applications, the sensor assembly 10 may be retrofit with the fire hydrant 26 (including with multiple sensor assemblies 10 being retrofit with multiple fire hydrants 26) with the aperture 55 in upper standpipe 34 being formed therein by drilling and sized to accommodate threading of the sensor unit 12 and conduit 18 therethrough. In the present implementation of sensor assembly 110, access to the portion of the operating valve stem 48 adjacent the valve 40 must be gained for assembly of the clamp assembly 58 therewith to achieve the desired positioning of the sensor unit 12. Accordingly, the bonnet 28, which may bear the operating nut 46, can be disassembled from the upper standpipe 34. This can provide access to the operating valve stem 48, which can be raised out of the fire hydrant 26 and withdrawn the valve 40. With the operating valve stem 48 thusly positioned, the clamp 60 can be affixed with the operating valve stem 48 by assembly of the cover 66 with the base 64, as discussed above. The assembly of the clamp 60 can be done before or after assembly of clamp 62 with the sensor unit 12 to achieve assembly of the support structure 20 for retention of sensor unit 12 within the interior 24 of the fire hydrant 26 upon subsequent re-assembly of the bonnet 28 and the operating valve stem 48 with the upper standpipe 34 and the valve 40, respectively. During such re-assembly, the conduit 18 can be positioned between legs 47 of a spider coupling 48 that can be fixed along operating valve stem 48 to prevent buckling thereof and/or to connect together separate segments of the operating valve stem 48. To allow for the desired positioning of the sensor unit 12 to remain after a subsequent use of the fire hydrant 26, the assembly can be made with some degree of slack in the conduit 18 to accommodate the downward movement of the operating valve stem 48 associated with opening of the valve 40 within the liner 44 and away from valve seat flange 42.

Figure 3:
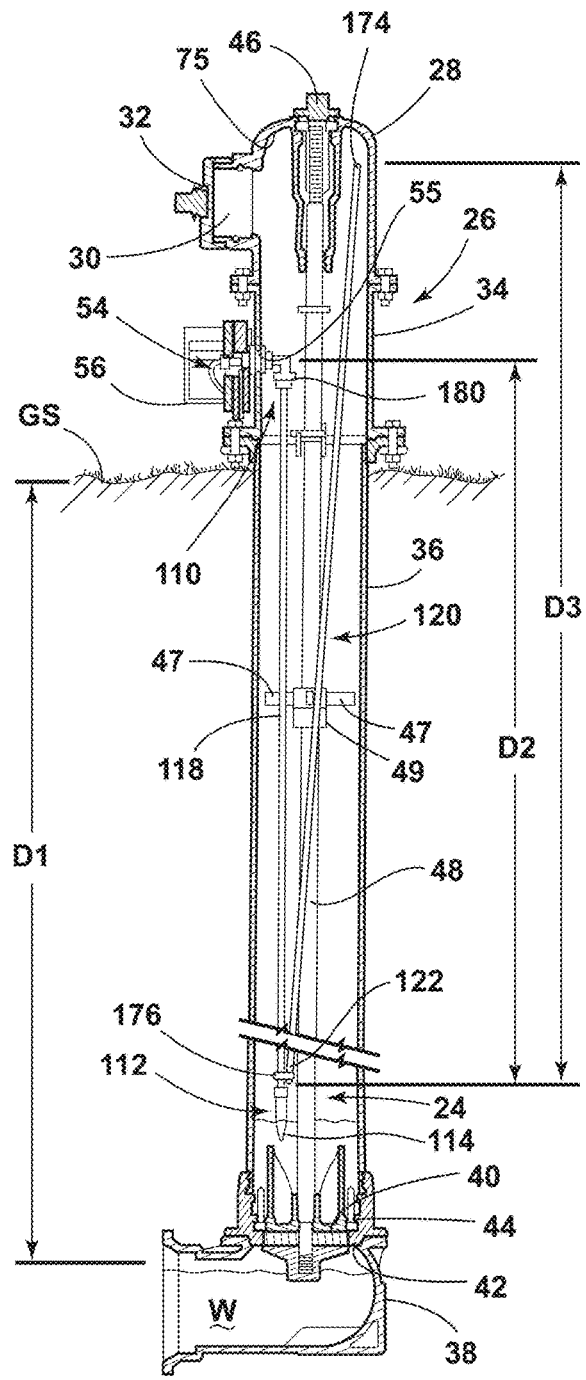
FIG. 3 is a side view of a sensor assembly according to another aspect of the present disclosure installed in a fire hydrant, shown in a side cross-section view.

Turning now to FIG. 3, an alternative sensor assembly 110 is shown in which the rigid support structure 120 includes an additional solid, elongate body in the form of a support rod 170 to which the sensor unit 112 is coupled such that the sensor unit 112 remains uncoupled with the operating valve stem 48 of the fire hydrant 26. As shown, the support rod 170 has a first end 172 with which the sensor unit 112 is coupled and a second end 174 configured to extend away from the sensor unit 112, through the lower standpipe portion 36 and the upper standpipe portion 34, and into the bonnet portion 28 of the fire hydrant 26. When the valve 40 is in the above-described closed position, such that there is no upward flow of fluid through the lower standpipe portion 36, etc., the sensor unit 112 remains positioned in the interior 24 of the fire hydrant 26 within the lower standpipe 36 and adjacent the valve 40 to monitor for, by way of example, the presence of water W above the valve 40. Specifically, the depicted position of the sensor unit 112 can be maintained under the force of gravity on the sensor unit 112 and the support rod 170 by way of the support rod 170 being coupled with the sensor unit 112, with the force of gravity being opposed by the conduit 118 such that the length and general resiliency of the conduit 118 establishes the position of the sensor unit 112. The support rod 170 can be coupled with the sensor unit 112, specifically the sensor unit 112, by way of a connector 176 affixed to the first end 172 of the support rod 170. In various implementations, the connector 176 can be a clamp or clamp assembly, which in a specific implementation may be similar to the clamp assembly 158 discussed above with respect to FIGS. 2A and 2B, although other structures or elements may be used to a similar end. In other implementations, the connector 176 can be an elastic member, including but not limited to an elastomeric element including respective apertures to receive the sensor unit 112 and the first end 172 of the support rod 170, respectively, under tension of the connector 176. In additional implementations, an elastomeric element with a single aperture (i.e., an O-ring, band, or the like) can be assembled over both the first end 172 of the support rod 170 and the sensor unit 112 together. In still further implementations, known devices can be used for the connector 176, including one or more cable ties, pipe clamps, or various adhesive tapes that are compatible with use in cold and/or wet environments. In a still further variation, the support rod 170 can define a part of the sensor unit 112 by embedding the electronic components 116 associated therewith into the end 122 of support rod 170.

Thusly assembled, the support rod 170 maintains the sensor unit 112 within the fire hydrant 26 against the flow of fluid past the valve 40 and upward through lower standpipe 36 by the force of the water W on the sensor unit 12 causing the support rod 170 to be pushed upward such that the second end 174 of the support rod 170 contacts the interior surface 29 of the bonnet 28. In this manner, the rigidity of the support rod 170 and its coupling with the sensor unit 112 serve to maintain the sensor unit 112 within the interior 24 of the fire hydrant 26 during use of the fire hydrant 26 and to urge the sensor unit 112 back into the desired monitoring position when use of the fire hydrant 26 ceases. The support rod 170 can, accordingly have a length D3 that is greater than the length D1 of the lower standpipe 36 and also greater than the length D3 of the conduit 118 such that the second end 274 of the support rod 270 is maintained in a position adjacent or within the bonnet 28 but not in contact with the interior surface 29 thereof to minimize tension on the support rod 170 or the conduit 118. This arrangement may allow for some upward movement of the support rod 170 and the sensor unit 112 during use of the fire hydrant 26, but not by an amount sufficient to allow dislodgement of the sensor unit 112 or to prevent movement of the sensor unit 112 back into the desired monitoring position (in one example, upward movement of between about 2 and 3 inches may be realized).

To function as described the support rod 170 can be of a generally lightweight, rigid material, including plastic tubing of a type useable in wet environments, fiberglass rod, sticks, or the like, or other similar materials. As with the implementation of the sensor assembly 110 discussed above, the present sensor assembly 110 can be assembled with the fire hydrant 26 in a retrofit arrangement by removing the bonnet 28 from the upper standpipe 34 to gain access to the interior 24 of the fire hydrant 26. As discussed above, the support structure 120 can be assembled with the sensor unit 112 during installation thereof, along with the electronics 54 and box 56, with the fire hydrant 26 by attachment of the first end 172 of the support rod 170 with the sensor unit 112 before the sensor unit 112 is lowered into the upper standpipe 34 through the opening realized by the removal of the bonnet portion 28. The support structure 120 can then be lowered into place along with the sensor unit 112 during feeding of the conduit 118 into the interior 24 of the fire hydrant 26, before coupling of the conduit 118 with the bulkhead fitting 57 and connection of the sensor unit 112 with the electronics 54 through aperture 55 replacement of the bonnet 28. In another aspect, the support structure 120 can be added to an in-place sensor unit 112 by removal of the bonnet 28 and withdrawal of the sensor unit 112 through lower standpipe 36 and through upper standpipe 34 by way of conduit 118. The sensor unit 112 can then be lowered back into place within the lower standpipe 36 adjacent the valve 40 along with the support rod 70 before replacement of the bonnet 28.

Figure 4:
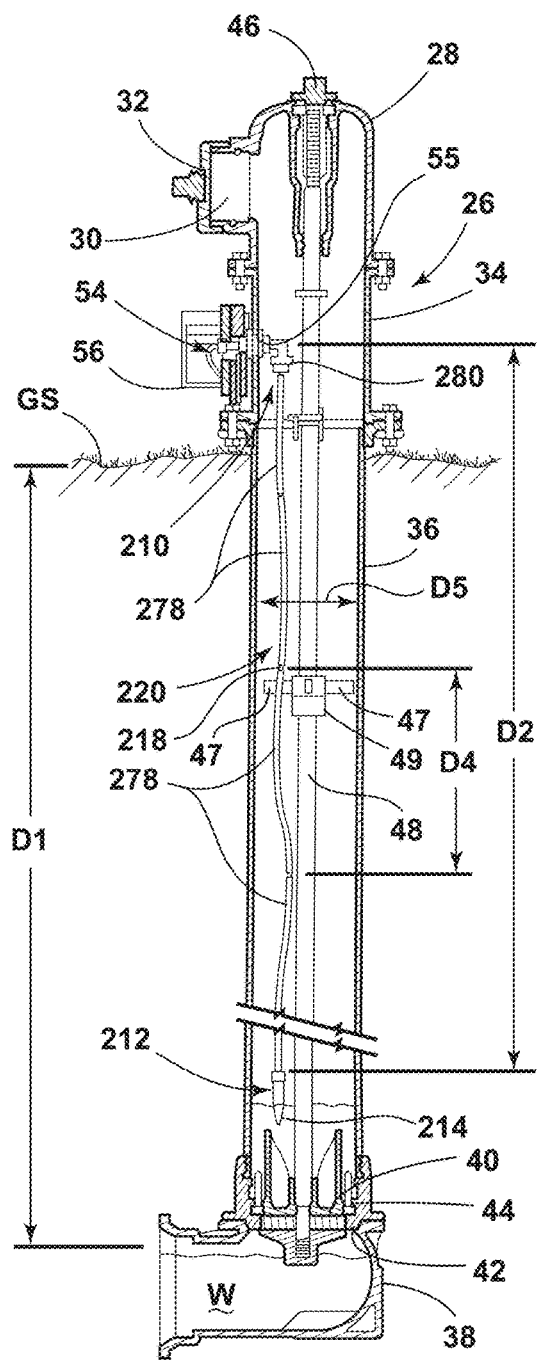
FIG. 4 is a side view of a sensor assembly according to yet another aspect of the present disclosure installed in a fire hydrant, shown in a side cross-section view.
Figure 5:
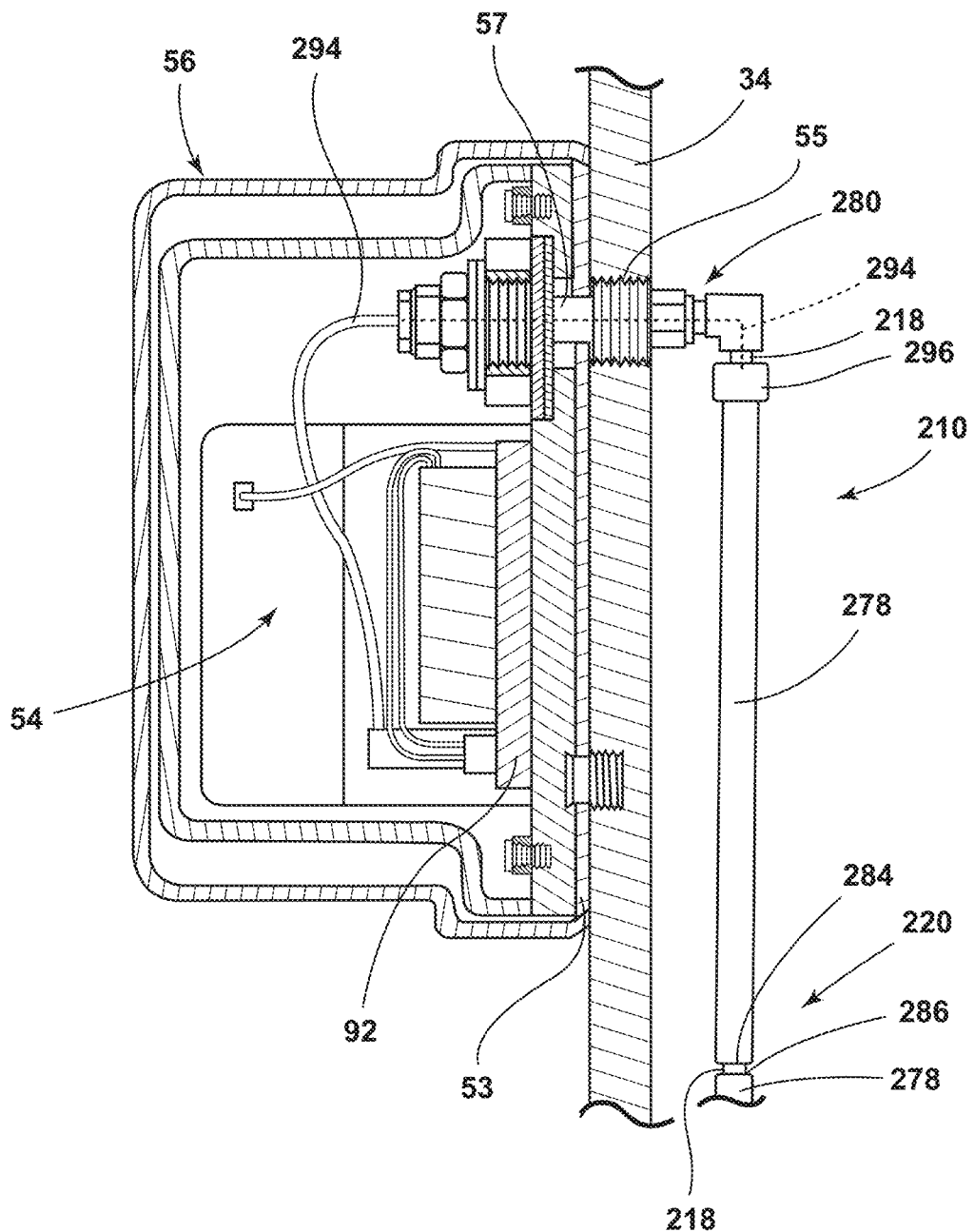
FIG. 5 is a cross-sectional detail view of a control box associated with the sensor assembly and a coupling of the sensor assembly with the control box and the fire hydrant.
Figure 6:
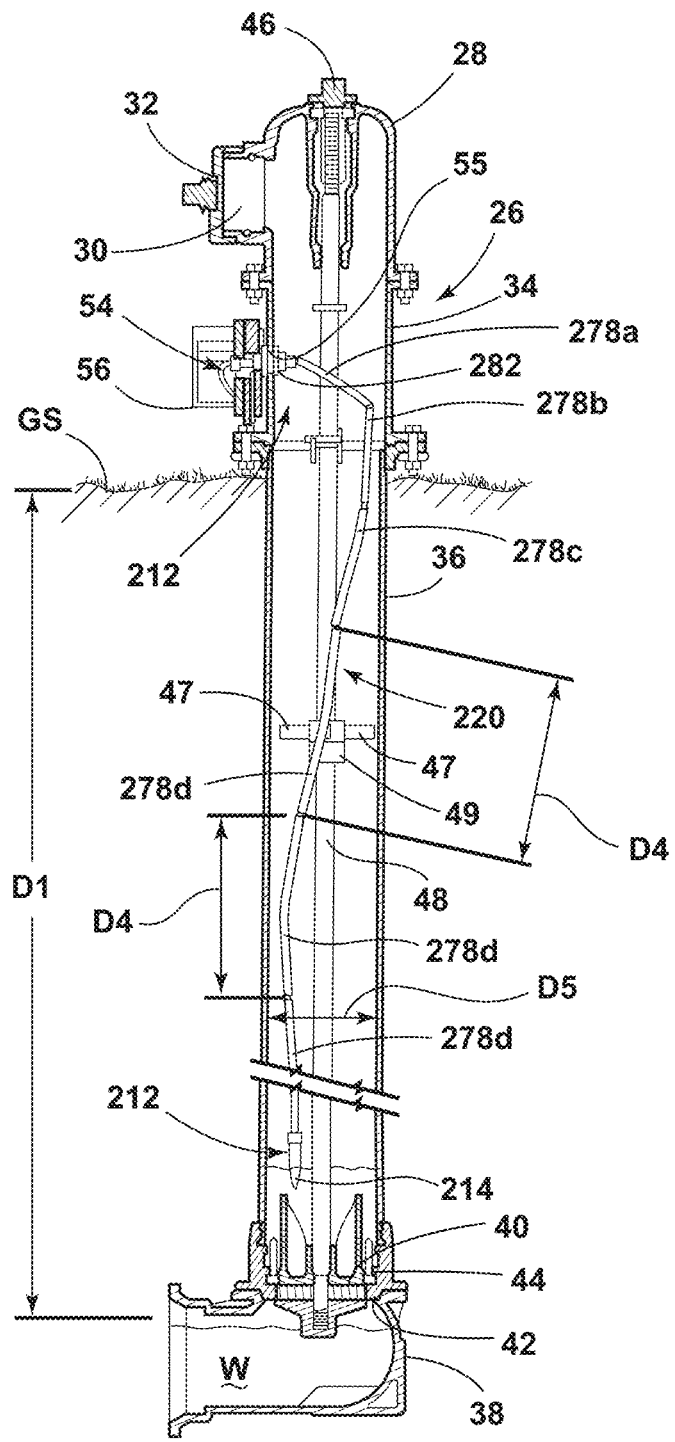
FIG. 6 is a side view of a variation of the sensor assembly of FIG. 5 installed in a fire hydrant, shown in a side cross-section view.

Turning to FIGS. 4-10, another implementation of the sensor assembly 210 is shown where the support structure 220 comprises a series of rigid tubes 278 that are hollow and surround respective portions of the conduit 218. In a similar manner to that which is discussed above, the conduit 218 of the present sensor assembly 210 extends from its coupling with the bulkhead fitting 57 that extends through the aperture 55 in the upper standpipe 34 to a length D2 corresponding with a position of the sensor unit 212 adjacent the valve 40 and remains in such a position by gravity when the valve 40 is closed (i.e., in absence of fluid flow past the valve 40 and into lower standpipe 36). The series of rigid tubes 278 collectively extend along the length D2 of the conduit 318 within the fire hydrant 26. As shown, each of the series of rigid tubes 278 is of the same diameter such that the rigid tubes 278 are sequentially arranged in an end-to-end manner extending upward from sensor housing 214 toward the aperture 55 in upper standpipe 34. As shown in FIGS. 4 and 5, the arrangement of the conduit 218 at the interface with the aperture 55 can include a 90° elbow fitting 280 to direct the conduit 218 downward into the lower standpipe 36. Alternatively, as shown in FIGS. 6, 7A, and 7B, the assembly 220 can include a generally straight grommet 282 therein such that the conduit 218 extends from the bulkhead fitting 57 into the interior 24 of the fire hydrant 26 in a radial direction and bends downward under its own weight, along with the weight of the rigid tubes 278, to extend toward valve 40. In the arrangement including the elbow 280 of FIG. 4, the rigid tubes 278 may be generally of the same length D4. Alternatively, in the arrangement of FIG. 5, the uppermost rigid tubes 278a, 278b, 278c, for example, may be shorter in length than the remaining rigid tubes 278d and may increase in length successively away from the grommet bulkhead fitting 57 (with the rigid tube 278a closest to the bulkhead fitting 57 being the shortest) so that the presence of rigid tubes 278a, 278b, and 278c does not interfere with the ability of the conduit 218 (given its own structure) to bend downward.

Figure 8:
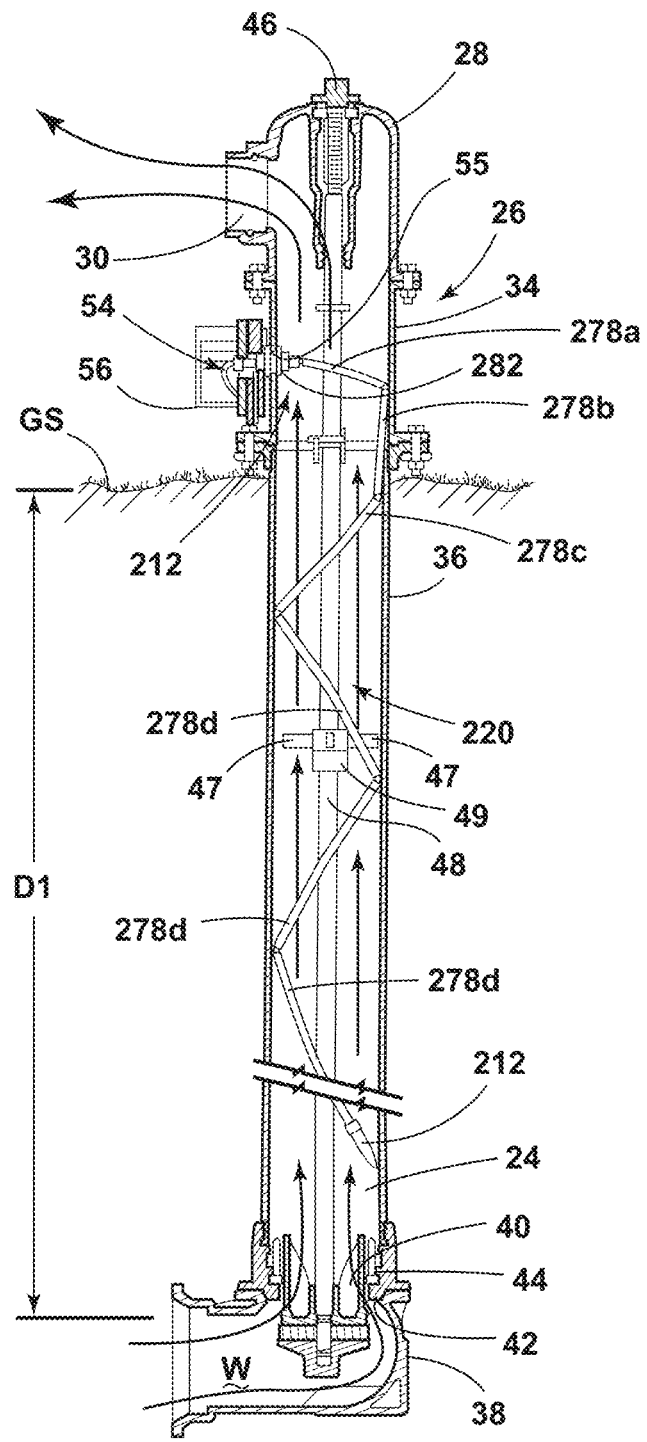
FIG. 8 is a side view showing the behavior of a support structure included in the sensor assembly of FIG. 6 in the presence of an upward flow of water through the fire hydrant.

In either of the above-described arrangements, at least the remaining ones of the rigid tubes 278 have a length D4 greater than a diameter D5 of the upper standpipe 34 (which is generally equal to the diameter of the lower standpipe 36) such that the series of rigid tubes 278 maintains the sensor unit 210 within the fire hydrant 26 by the rigid tubes 278 (to at least some extent) abutting opposing areas of either the upper standpipe 34 or the lower standpipe 36 at opposite ends (e.g., respective lower 284 and upper 286 ends) of the rigid tubes 278 under upward pressure on the sensor unit 210 and the rigid tubes 278 by the upward flow of water W past the valve 40 and upward through the lower standpipe 36. In other words, the rigid tubes 278 "jam" inside the lower standpipe 36 to prevent upward pushing of the sensor unit 212 beyond an initial distance corresponding with the upward jamming movement of the support structure 220, as illustrated in FIG. 8. The arrangement of the rigid tubes 278 also allows the rigid tubes 278 to extend around and past the operating valve stem 48, including when jammed upward by the flow of water, so as not to interfere with its operation and to further prevent the creation of a third point of contact for the rigid tubes 278 when in the jammed position, which can increase the likelihood that the rigid tube 278 remains in such a position.

As also shown in FIGS. 4-8, the rigid tubes 278 can be curved such that they can nest within the interior curvature of the lower standpipe 36 in the above-described wedged, or jammed, condition. As shown, the curvature of the rigid tubes 278 can be greater (i.e. a larger radius) than the inner radius of the lower standpipe 36 to nest along the interior surface of the lower standpipe 36 while the rigid tubes 278 remain at a significant downward angle. In one example, the rigid tubes 278 can be curved to have a radius of between about five feet and about ten feet. In other examples, the curvature of the rigid tubes 278 can be parabolic, hyperbolic, catenary, or the like and can be measurable to a similar degree as the circular curves described herein. In this manner, the desired nesting is achieved with minimal upward movement of the lower rigid tubes 278d (for example) and the sensor unit 212. The nesting achieved by the curved configuration of the rigid tubes 278 can increase the friction between the rigid tubes 278 and the interior of the lower standpipe 36 to further the jamming action achieved by the support assembly 220. Additionally, the nesting arrangement can reduce pressure on the ends 284 and 286 of the rigid tubes 278 and/or any portions of the conduit 218 that may become exposed between successive rigid tubes 278 when the jamming causes relative angling therebetween. In other embodiments or applications, at least some of the rigid tubes 278 can be straight. In either implementation, the rigid tubes 278 can be segments of ½" stainless steel tubing (having an internal diameter of between about ⅜" and ⁷⁄₁₆", for example, although other inner and outer dimensions are possible), cut to the desired length(s) and, if desired, bent to the desired curvature using known means. The specific lengths and number of rigid tubes 278 used in the support assembly 220 can vary with the dimensions of the fire hydrant 26 (or other fluid bearing structure associated with the interior 24), including the diameter and length of the lower standpipe 36, and the positioning and arrangement of the aperture 55 and interface of the conduit 218 therewith, as discussed above. In one example, the support assembly may include between 4 and 6 full-length rigid tubes 278d (in connection with either the implementations of FIGS. 5 and 6 or FIGS. 7 and 8), each having a length of between 18" and 30". In the implementation associated with the interface arrangement in FIGS. 6 and 7A, an additional three shorter rigid tubes 278a, 278b, and 278c may also be included. Specific variations of such an arrangement can be used with fire hydrants having an internal diameter of up to about 10" and a lower standpipe 36 having a length D1 of up to 10 feet or more.

Figure 9:
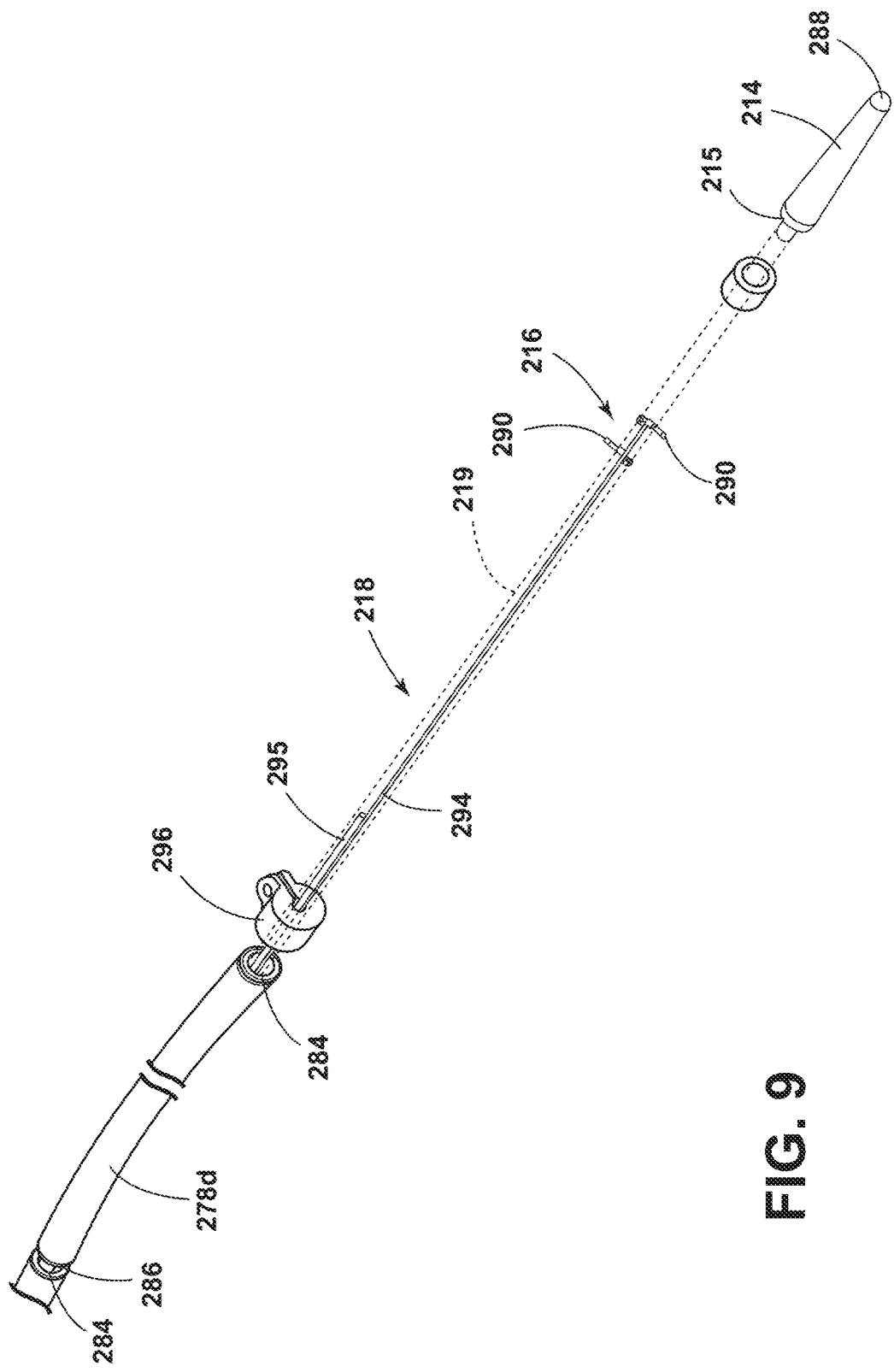
FIG. 9 is a cutaway view of a conduit coupled with a sensor unit and an associates support structure of the sensor assembly of FIGS. 5 and 6.

Turning now to FIG. 9, details of the structure of the present support assembly 220, conduit 218 and sensor unit 212 are shown. In particular, the sensor assembly 210 includes the above-described conduit 218 and sensor unit 212. The sensor unit 212 includes a sensor body 214, which can have, but is not limited to, a substantially conical shape. The conical shape can be, by way of non-limiting example, substantially frusto-conical terminating in a blunt apex 288. The sensor body 214 can be made of a copolymer material. The shape and material of the sensor body 214 give the sensor body 214 hydrodynamic properties to reduce resistance when water is flowing through the lower standpipe 36. The sensor body 214 can be co-molded with the above-mentioned electronic components 216 by way of a pair of electrically isolated terminals 290 such that an interior of the sensor unit 212 is fluidly isolated from an exterior thereof. The electrically isolated terminals 290 can be vertically spaced along the exterior of the sensor body 214 and can be located on opposite sides of the sensor body 214. The sensor unit 212 can also include a compression fitting 215 opposite the apex end 288 of sensor body 214 that fits over a ferrule backing assembled over the conduit 218 to seal the sensor unit 212 to the conduit 218.

Hardwired electrical connections for the sensor unit 212 extend through the conduit 218 and, in particular, connect the electrically isolated terminals 290 to the electronics 54 within box 56 (FIGS. 5 and 7A) and in electrical communication with circuit board 92 by a wire 294. The wire 294 can be a dual filament wire that can form separate connections with respective ones of the electrically isolated terminals 290 such that the terminals 290 become electrically interconnected and register a water presence when both electrically isolated terminals 290 are simultaneously in contact with water by completing the circuit with circuit board 92 through the wire filaments. In addition to the wire 294, the conduit 218 can also include or contain a spring rod 295 that can add some structural stiffness to the conduit 218, as discussed above, which can assist in maintaining the location of the sensor unit 212 and can make the conduit 218 more resistant to damage.

As illustrated, the conduit 218 is fed through the rigid tubes 278 such that they surround the conduit 218. In this manner, the sizing of the rigid tubes 278 can be selected to fit over the conduit 218 without significant interference or laxity that might cause significant misalignment of the adjacent ends 284 and 286 of the adjacent rigid tubes 278. The rigid tube 228 closest to the sensor unit 212 can include a clamp 296 sized to fit over the end 284 of the rigid tube 278 and to grasp the underlying portion of the conduit 218. A similar clamp 296 can be included on the upper end 286 of the rigid tube 278a closest to the aperture 55 (FIGS. 5 and 7A), although some implementations of the sensor assembly 210, particularly those in which the rigid tube 278a closest to the aperture 55 is bent or curved, may omit such a clamp. The inclusion of clamp 296 can help maintain the desired positioning of the rigid tubes 278 over conduit 218 and relative to each other and can prevent the weight of the rigid tubes 278 from bearing on the sensor unit 212. In an example, the clamp or clamps can be of acetal plastic or the like, which may be selected for its general water-compatible qualities, although other more rigid materials may be used. In addition, a bumper 298 can be positioned around the conduit 218 between the clamp 296 and the sensor unit 212 to prevent relative movement between the lowermost rigid tube 278 and the sensor unit 212 from damaging the sensor unit 212. The bumper 298 can be of a water-compatible material with sufficient cushioning properties, such as various rubbers or the like.

Figure 7A:
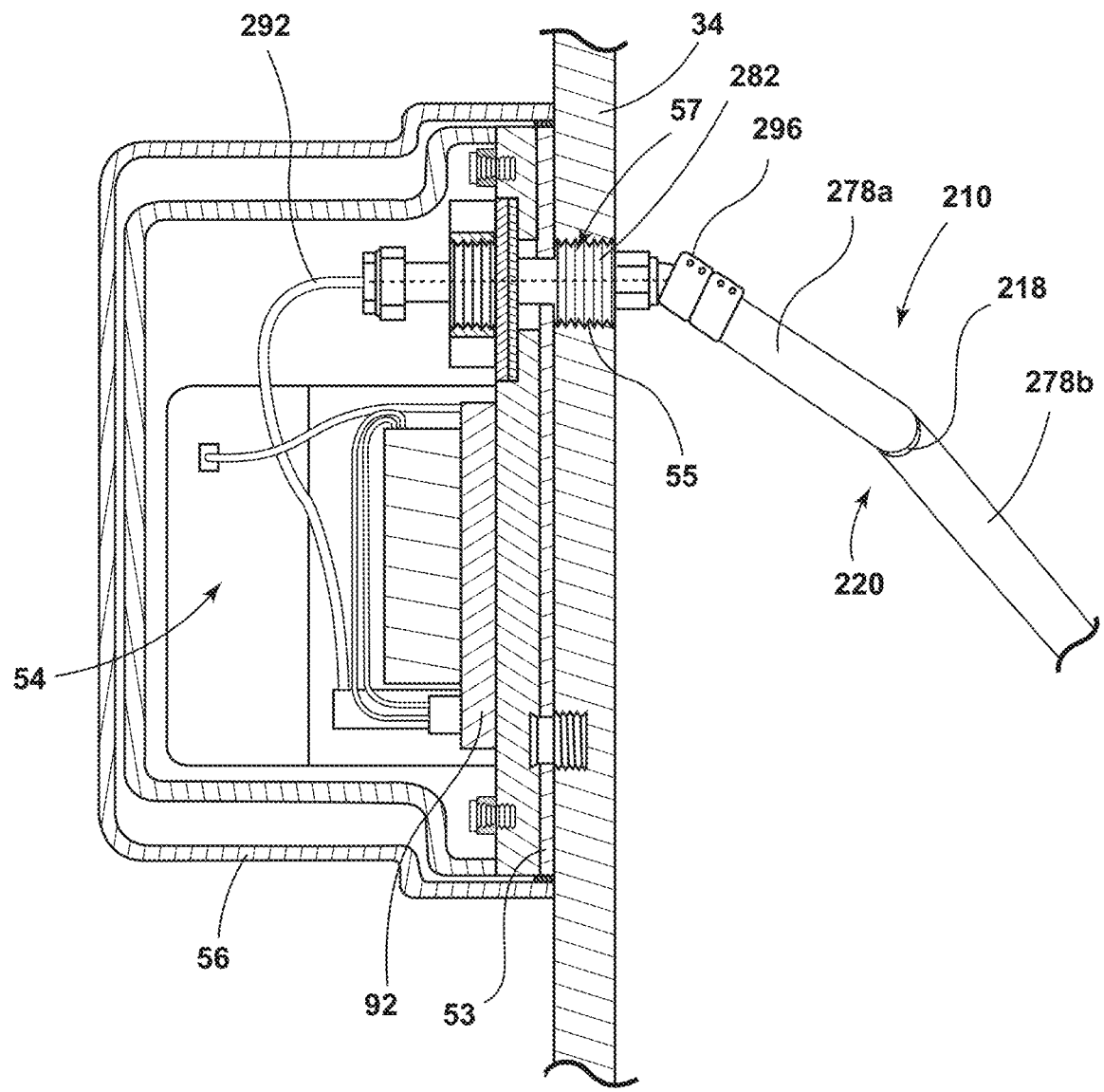
FIG. 7A is a cross-sectional detail view of a control box associated with the sensor assembly of FIG. 6 and a coupling of the sensor assembly with the control box and the fire hydrant.
Figures 7B, 7C:
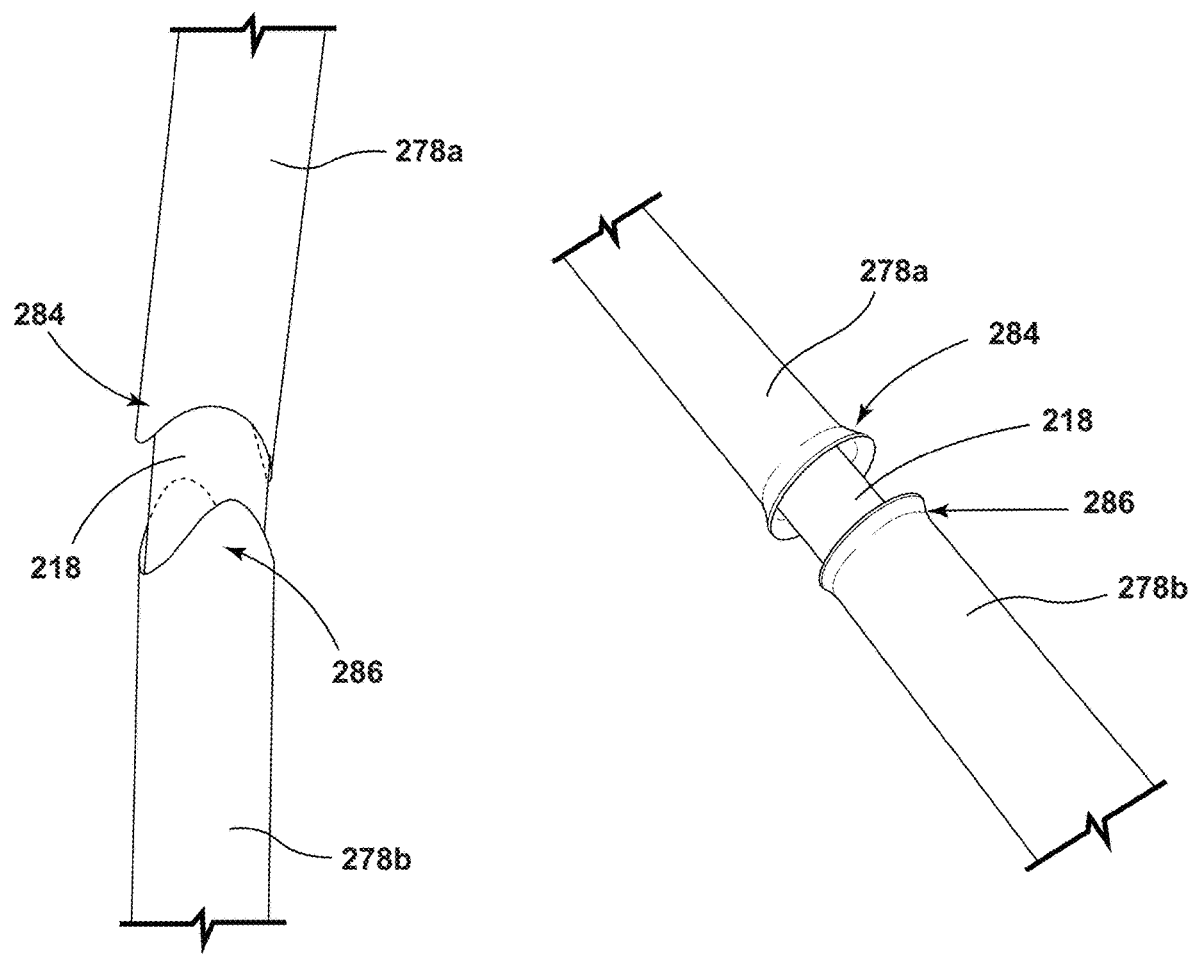
FIG. 7B is a detail view of an end profile of a rigid tube included in the sensor assembly.
FIG. 7C is a detail view of an alternative end profile of a rigid tube included in the sensor assembly.

As further illustrated in FIG. 7B, the ends 284 and 286 of the rigid tubes 278 can be ground down or otherwise shaped to remove sharp edges around the inside and outside thereof. More particularly, the ends 284 and 286 of each of the series of rigid tubes 278 can have a rounded cross-section along a longitudinal axis of the rigid tube 278 at least by providing a greater contact area to distribute any compressive force applied thereto. The rounded ends 284 and 286 can minimize potential damage to the portions of the conduit 218 that align with the ends 284 and 286 of the rigid tubes 278, as well as the ends 284 and 286 of the tubes 278 as they contact and move relative to each other and can urge the adjacent rigid tubes 278 into the desired mutual alignment, as shown in FIG. 7B. Additionally, the round profile on the ends 284, 286 can prevent the rigid tubes 278 from becoming lodged in the jammed position within the lower standpipe 36, or the upper standpipe 34 (which may, in at least some applications, be referred to as the "barrel" of the fire hydrant 26). In an alternative arrangement, shown in FIG. 7C, the ends 284 and 286 of the rigid tubes 278 can flare outwardly to position the edges of the ends 284 and 286 away from the conduit 218 to reduce contact therewith and remove the localized contact point between the ends 284 and 286 to reduce stress applied to the conduit 218.

Figure 10:
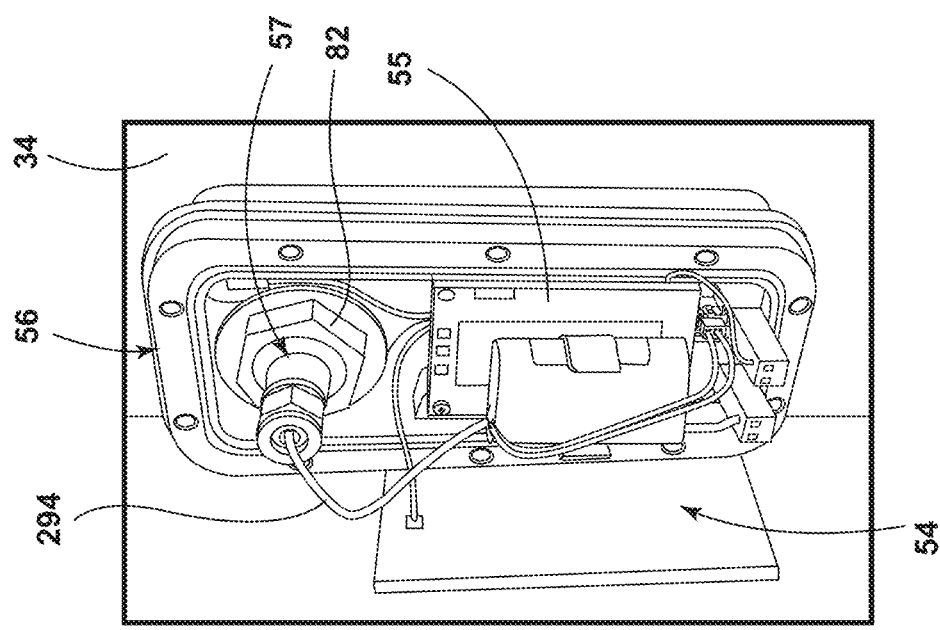
FIG. 10 is a perspective view depicting a step of a process for installing the sensor assembly of FIGS. 5 and 6 in a fire hydrant.

With general reference to FIGS. 5 and 7A, as well as reference to FIG. 10, in one aspect, the present sensor assembly 210 can be assembled with the fire hydrant 26 by sequentially feeding the above-described components of the sensor assembly 210 into the interior 24 of the fire hydrant through an opening achieved by the removal of the bonnet portion 28. In particular, the sensor unit 212 is introduced to the interior 24 of the fire hydrant 26, followed by the conduit 218, which is lowered into the interior 24, along with the rigid tubes 278, in series.

After the conduit 218 and the support structure 220 have been positioned within the interior 24, the conduit 218 can be coupled with the above-described bulkhead fitting 57, which is mounted to be in register with the exterior of the fire hydrant 26 along the upper standpipe 34. The above described straight coupling fixture 282 is affixed with the bulkhead fitting 57 and is fixed within the aperture 55 by the assembly of the bulkhead fitting 57 with the fire hydrant 26. The bulkhead fitting 57 can be mounted to be in register with the exterior of the fire hydrant 26 mechanically, adhesively, or a combination of both mechanically and adhesively. The base 53 of the housing 54 is then mounted over the bulkhead fitting 57, as shown in FIG. 10, by way of the attachment nut 51 which is received over a threaded end of the fitting 82. In this respect, it is noted that the arrangement shown in FIG. 5, in which an elbow fitting 80 is used, is similarly assembled with the fire hydrant 26. The electronic components 54 of the system 210 can be mounted to or otherwise assembled with the base 51 and the wire 294 can be attached with the circuit board 92 included in the electronics 54 upon assembly of the base 51 with the bulkhead fitting 57. A housing cap 53a can be mounted to the base 51 (FIG. 7A) via fasteners. Finally, a housing cover 53b (FIG. 7A) is placed over the housing cap 53a.

As discussed above, the present sensor assembly 210 can be installed in an in-place fire hydrant 26 in the field by way of the above process. Additionally, the support structure 220 depicted in FIGS. 3-10 can be retrofit with an in-place sensor assembly similar to the sensor assembly 10 depicted in FIG.

1 by removal of the cover 53b and housing cap 53a in reverse of the process discussed above with respect to FIG. 10 and withdrawal of the conduit 18 and sensor unit 12 from out the interior 24 fire hydrant 26 by removal of the bonnet portion (notably, without movement of the operating valve stem 48 of the connected valve 40, which removes the need to use a crane or the like in connection with the operation). After detachment of the wire 94 from the circuit board 92, the fitting 80 can be removed from the conduit 18 to allow assembly of the rigid tubes 278 (which may vary in length), as discussed above, over the conduit 18, including the assembly of bumper 298 and clamp 296, as applicable. Once the rigid tubes 278 are in place, the upper clamp 296 can be assembled with the respective rigid tube 278 and the resulting assembly 210 can be replaced, as discussed above. In an alternative process, the sensor assembly can be configured to be fed through aperture 55 with the longer of the rigid tubes 378 being angled downwardly within the interior 24 of the fire hydrant 26 to be fed through the aperture 55, such that the diameter of the aperture 55 and the length D4 of the longest of the rigid tubes 378 can be adjusted to allow for the rigid tubes 378 to have generally sufficient lengths (according to the principles discussed above) that can be assembled through aperture 55. Such a process may allow for the present sensor assembly to be installed in an in-place fire hydrant 26 without removal of the bonnet 28.

In a still further sensor assembly, a generally hook-shaped support structure enclosing or otherwise supporting a similar conduit and sensor unit can be inserted into the lower standpipe of a fire hydrant by way of an existing Carrol drain. As generally known, a Carrol drain may be included in a fire hydrant to allow any water present above the valve of a dry barrel fire hydrant to exit the lower standpipe, either under gravity or air pressure (by way of air being pumped into the fire hydrant.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A method for installing a sensor assembly in a fire hydrant, comprising:
   removing a bonnet portion of the fire hydrant to access an interior of the fire hydrant;
   inserting a sensor assembly, including a sensor unit having at least one electronic sensor component and a conduit coupled with the sensor and extending away from the sensor unit, into the interior of the fire hydrant;
   connecting the conduit with a fitting received in an aperture through a portion of the fire hydrant; and
   supporting a portion of at least one of the conduit or the sensor unit with a rigid support structure at a first end adjacent the sensor unit and extending away from the sensor unit to a length of at least about 6 feet, the rigid support structure configured to maintain the sensor unit within the interior of the fire hydrant, between a valve seat flange and an operating nut of the fire hydrant, for monitoring using the electronic sensor component.

2. The method of claim 1, wherein the rigid support structure is an operating valve stem extending from the valve mounted within a valve seat flange defined between a lower standpipe portion of the fire hydrant and a shoe coupled therewith to a valve operating nut positionable on an exterior of the bonnet portion.

3. The method of claim 2, wherein supporting the portion of at least one of the conduit or the sensor unit with the rigid support structure includes coupling the at least one of the conduit or the sensor unit to the operating valve stem adjacent the valve.

4. The method of claim 1, wherein:
   the rigid support structure is a solid, elongate body; and
   supporting the portion of at least one of the conduit or the sensor unit with the rigid support structure includes coupling a first end of the solid, elongate body with the sensor unit prior to inserting the sensor assembly into the interior of the fire hydrant.

5. The method of claim 4, further including assembling the bonnet portion with an upper standpipe portion of the fire hydrant such that a second end of the solid, elongate body is positioned within an interior of the bonnet portion.

6. The method of claim 1, wherein the rigid support structure is defined by a series of rigid tubes surrounding respective portions of the conduit.

7. The method of claim 6, wherein supporting the portion of the at least one of the conduit or the sensor unit with the rigid support structure includes assembling the series of rigid tubes over the conduit prior to the step of inserting the sensor assembly into the interior of the fire hydrant.

8. A method for installing a sensor assembly in a fire hydrant, comprising:
   accessing an interior of the fire hydrant structure from an exterior of the fire hydrant;
   inserting a sensor assembly, including a sensor unit having at least one electronic sensor component and a conduit coupled with the sensor and extending away from the sensor unit, into the interior of the fire hydrant;

connecting the conduit with a fitting received in an aperture from the exterior to the interior of the fire hydrant; and supporting a portion of at least one of the conduit or the sensor unit with an operating valve stem of the fire hydrant at a first end adjacent the sensor unit and extending away from the sensor unit to a length of at least about 6 feet, the operating valve stem extending from the valve mounted within a valve seat flange defined between a lower standpipe portion of the fire hydrant and a shoe coupled therewith to a valve operating nut positionable on an exterior of the bonnet and maintaining the sensor unit within the interior of the fire hydrant for monitoring using the electronic sensor component.

9. The method of claim 8, wherein supporting the portion of at least one of the conduit or the sensor unit with the rigid support structure includes coupling the at least one of the conduit or the sensor unit to the operating valve stem adjacent the valve.

10. The method of claim 8, wherein supporting the portion of at least one of the conduit or the sensor unit with the operating valve stem includes coupling the sensor unit with the operating valve steam prior to inserting the sensor assembly into the interior of the fire hydrant.

11. A method for installing a sensor assembly in a fire hydrant, comprising:

removing a bonnet portion of the fire hydrant to access an interior of the fire hydrant;

inserting a sensor assembly, including a sensor unit having at least one electronic sensor component and a conduit coupled with the sensor and extending away from the sensor unit, into the interior of the fire hydrant;

connecting the conduit with a fitting received in an aperture through a portion of the fire hydrant; and supporting a portion of at least one of the conduit or the sensor unit with a rigid support structure at a first end adjacent the sensor unit and extending away from the sensor unit to a length of at least about 6 feet, the rigid support structure configured to maintain the sensor unit within the interior of the fire hydrant for monitoring using the electronic sensor component;

wherein the rigid support structure is defined by a series of rigid tubes surrounding respective portions of the conduit.

12. The method of claim 11, wherein supporting the portion of the at least one of the conduit or the sensor unit with the rigid support structure includes assembling the series of rigid tubes over the conduit prior to the step of inserting the sensor assembly into the interior of the fire hydrant.

13. The method of claim 11, further including assembling the bonnet portion with an upper standpipe portion of the fire hydrant such that an end of one of the series of rigid tubes is positioned within an interior of the bonnet portion.

14. The method of claim 3, wherein coupling the at least one of the conduit or the sensor unit to the operating valve stem adjacent the valve includes coupling a first portion of a clamp assembly with the operating valve stem and coupling a second portion of the clamp assembly with the least one of the conduit or the sensor unit.

\* \* \* \* \*